United States Patent
Jambigi et al.

(10) Patent No.: US 10,801,500 B2
(45) Date of Patent: Oct. 13, 2020

(54) COMPRESSOR SYSTEM SEPARATOR TANK BAFFLE

(71) Applicant: Ingersoll-Rand Company, Davidson, NC (US)

(72) Inventors: Mallikarjun Jambigi, Bangalore (IN); Tippanna Badiger, Bangalore (IN); Daniel McGuinness, Charlotte, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 64 days.

(21) Appl. No.: 15/685,443

(22) Filed: Aug. 24, 2017

(65) Prior Publication Data

US 2019/0063437 A1 Feb. 28, 2019

(51) Int. Cl.
*B01D 45/00* (2006.01)
*F04C 29/02* (2006.01)
*B01D 45/08* (2006.01)
*B01D 45/06* (2006.01)
*F04C 18/16* (2006.01)
*B01D 17/02* (2006.01)
*B01D 21/00* (2006.01)

(52) U.S. Cl.
CPC ............ *F04C 29/026* (2013.01); *B01D 45/06* (2013.01); *B01D 45/08* (2013.01); *B01D 17/0208* (2013.01); *B01D 17/0211* (2013.01); *B01D 21/0042* (2013.01); *B01D 21/0045* (2013.01); *F04C 18/16* (2013.01); *Y10S 418/01* (2013.01)

(58) Field of Classification Search
CPC ........ F04C 29/026; F04C 18/16; B01D 45/06; B01D 45/08; B01D 21/0045; B01D 21/0042; B01D 17/0208; B01D 17/0211; Y10S 418/01
See application file for complete search history.

(56) References Cited

U.S. PATENT DOCUMENTS 1,113,041 A * 10/1914 Murphy ................... F02M 1/00
48/189.4
1,632,325 A * 6/1927 Anderson .............. B01D 45/08
55/446

(Continued)

OTHER PUBLICATIONS

BogeAir, Screw Compressors S Series, on or before Sep. 16, 2016, 28 pages.

(Continued)

*Primary Examiner* — Dung H Bui
(74) *Attorney, Agent, or Firm* — Taft Stettinius & Hollister LLP

(57) ABSTRACT

A separation tank useful to separate a compressed gas from a byproduct of compression (such as a lubricant/coolant used in the compression process) can include one or more baffles. The baffles used in the separation tank can include a number of passages to permit a flow of compressed gas to pass. The passages can include a louver to assists in directing the flow and/or assist in further separation of the compressed gas from the lubricant/coolant. The louvers can appear on one side of the baffle, and in one form are located solely on the downstream side of the baffle. The baffle can include a relief for liquid leveling within the tank. Any number of approaches can be used to make the baffle, including cutting and/or stamping.

6 Claims, 6 Drawing Sheets

(56) References Cited

U.S. PATENT DOCUMENTS

| | | | | |
|---|---|---|---|---|
| 2,290,323 | A | * | 7/1942 | Graham ................. B01D 45/08 55/436 |
| 2,312,639 | A | * | 3/1943 | Gronemeyer ......... B01F 3/0873 425/68 |
| 2,827,126 | A | * | 3/1958 | Mazur .................... B01D 45/06 96/263 |
| 3,291,385 | A | | 12/1966 | Williams et al. |
| 3,606,738 | A | * | 9/1971 | Kraus ..................... B01D 3/20 55/446 |
| 4,722,800 | A | | 2/1988 | Aymong |
| 4,744,958 | A | * | 5/1988 | Pircon .................... B01D 45/08 261/116 |
| 4,981,368 | A | * | 1/1991 | Smith .................... B01F 5/0473 366/337 |
| 5,697,763 | A | | 12/1997 | Kitchener |
| 5,853,443 | A | | 12/1998 | Rodgers et al. |
| 5,947,711 | A | | 9/1999 | Myers et al. |
| 8,272,777 | B2 | * | 9/2012 | Kohrs ................... B01F 5/0643 366/337 |
| 9,347,355 | B2 | * | 5/2016 | Floyd .................... F01N 3/2066 |
| 2002/0189213 | A1 | * | 12/2002 | Neuschwander ...... B01D 45/08 55/385.3 |
| 2003/0014951 | A1 | | 1/2003 | Crouse |
| 2008/0250776 | A1 | * | 10/2008 | Brown ................ B01F 3/04049 60/299 |
| 2010/0107617 | A1 | * | 5/2010 | Kaiser ................ B01F 3/04049 60/324 |
| 2010/0282694 | A1 | * | 11/2010 | Menchaca Lobato ....................... B01D 17/0211 210/802 |
| 2011/0174407 | A1 | * | 7/2011 | Lundberg ............. B01F 5/0618 138/37 |
| 2011/0209446 | A1 | * | 9/2011 | Kayat .................... B01D 45/08 55/322 |
| 2012/0125040 | A1 | | 5/2012 | Matsui |
| 2013/0255308 | A1 | | 10/2013 | De Larminat |
| 2016/0175749 | A1 | * | 6/2016 | Suda ..................... B01D 45/04 95/269 |
| 2016/0175784 | A1 | * | 6/2016 | Harmon ................ B01F 5/0473 366/167.1 |
| 2017/0043289 | A1 | * | 2/2017 | Herman ............. B01D 46/0049 |
| 2019/0078472 | A1 | * | 3/2019 | Tan ......................... F01D 25/32 |

OTHER PUBLICATIONS

ELGI Equipments Limited, Air Compressors, on or before Sep. 16, 2016, 13 pages.
Extended European Search Report, European Patent Application No. 18190858.3, dated Jan. 2, 2019, 6 pages.

* cited by examiner

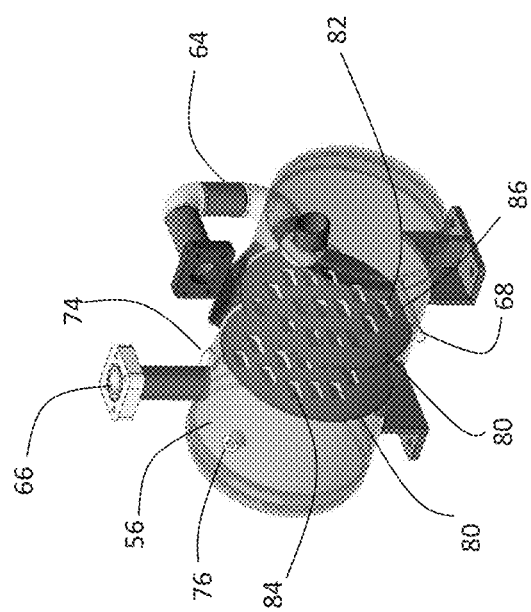

COMPRESSOR SYSTEM SEPARATOR TANK BAFFLE

TECHNICAL FIELD

The present invention generally relates to compressor system separator tanks, and more particularly, but not exclusively, to compressor system separator tanks having internal baffling.

BACKGROUND

Providing baffling to aid in the separation of compressed gas from liquids such as coolants/lubricants remains an area of interest. Some existing systems have various shortcomings relative to certain applications. Accordingly, there remains a need for further contributions in this area of technology.

SUMMARY

One embodiment of the present invention is a unique baffle for use with a compressor system separator tank. Other embodiments include apparatuses, systems, devices, hardware, methods, and combinations for separating coolant/lubricant from a flow of compressed gas. Further embodiments, forms, features, aspects, benefits, and advantages of the present application shall become apparent from the description and figures provided herewith.

BRIEF DESCRIPTION OF THE FIGURES

FIG. 2B depicts another view of the embodiment of the separator tank shown in FIG. 2A.

DETAILED DESCRIPTION OF THE ILLUSTRATIVE EMBODIMENTS

Figure 1:
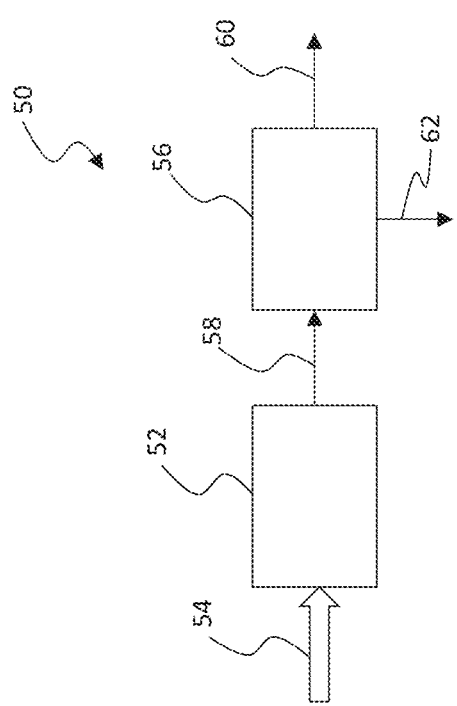
FIG. 1 depicts one embodiment of a compressor system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor system 50 is illustrated which includes a compressor 52 used to pressurize an incoming gas 54 as well as a separator tank 56 useful to separate a flow 58 that includes compressed gas and a byproduct of compression such as a lubricant and or coolant (e.g. a lubricant or coolant mist). Further discussion below may refer to the byproduct of compression as the lubricant and/or the coolant, but no limitation is hereby intended regarding the use of the byproduct whether solely as a lubricant or solely as a coolant. Mention of either lubricant or coolant refers generally to the byproduct and not the intended use of the byproduct. Thus, any mention of lubricant can apply equally to the byproduct used primarily as a coolant, and vice versa.

The compressor 52 can take on any variety of forms, and in one nonlimiting embodiment is a contact cooled compressor useful to compress a flow of air. The separator tank can pass along a filtered flow of compressed gas 60 and the byproduct of compression 62 (e.g. lubricant such as oil). Though the compressor system 50 is shown with just a compressor 52 and separator 56, other embodiments can include further devices, such as dryers, etc.

Figure 2A:
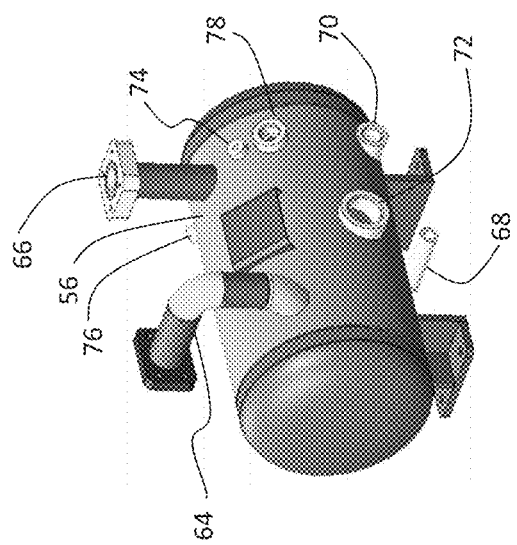
FIG. 2A depicts a view of one embodiment of a separator tank.
Figure 2C:
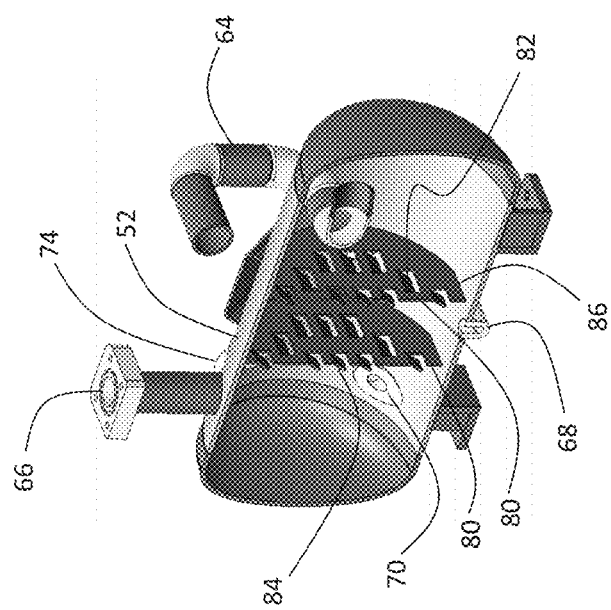
FIG. 2C depicts another view of the embodiment of the separator tank shown in FIG. 2A.

Turning now to FIGS. 2A-2C, various views of a separator tank 56 are shown. FIG. 2A depicts a perspective view of the outside of the separator tank 56; FIG. 2B depicts a view in which the outside of the separator tank is faded to reveal the interior of the tank 56; and FIG. 2C depicts a cutaway view of the tank 56. The tank 56 can be cylindrical in some forms, but not all embodiments. For example, the tank 56 can have a circular outer periphery and/or inner periphery, but other cross sectional shapes are also contemplated. The tank 56 includes an inlet passage 64 for receipt of the mixed flow 58 of compressed gas and lubricant passed from the compressor 52, as well as an outlet passage 66 for conveyance of compressed air in which at least some of the lubricant (e.g. lubricant mist) is removed. The inlet passage 64 can be arranged to deliver the mixed flow 58 to an inside face of an end of the tank 56, as can be seen in FIGS. 2B and 2C. The outlet passage can be used in some forms to pass pre-separated air with oil traces to an air-oil-separator element prior to being delivered elsewhere. As will be appreciated, although an air-oil-separator element can be used, it need not be used in all applications. The separator tank 56 can also include a drain port 68 and an oil port 70 used to convey oil to a thermal control valve (e.g. a valve that will regulate whether oil is passaged to an oil cooler before being recycled for later use in the compressor 52). The separator tank 56 can also include other features such as a sight glass 72, pressure measurement port 74, safety valve 76, and an oil fill port 78.

A baffle 80 is used internal to the tank 56 to further aid in the removal of lubricant mist from the flow. The baffle 80 is sized to extend substantially across the entirety of the inside of the tank 56 and includes a number of passages 82 and louvers 84. The passages 82 and louvers 84 are arranged in a grid like pattern with a middle three rows and three columns bounded on top and bottom by a set of two which is also bounded by a single passage 82 and louver 84 combination. Other variations are also contemplated. For example, any number of passages can be used in any combination and/or arrangement. Although each passage 82 includes a paired louver 84, not all embodiments need include louvers 84 for each passage 82.

The passages 82 can have any variety of cross sections, sizes, and numbers. In some forms the passages 82 need not be identical, although the passages are depicted as the same in the illustrated embodiment. The illustrated embodiment depicts passages 82 having a cross sectional shape of a rectangle in the illustrated embodiment. The material of the baffle 80 located between and around the passages 82 can provide a blockage that varies from embodiment to embodiment. In some forms the cross sectional area of the passages 82 can represent about the same cross sectional as the material located between and around the passages 82 and that define the shape of the baffle 80. In other forms the cross sectional area of the passages 82 can represent differing amounts, either higher or lower than the cross sectional area of the material defining the baffle. As shown in the illustrated embodiment, the cross sectional area of the passages is less than that of the cross sectional area of the material defining the baffle.

The louvers 84 extend from the baffle 80 and are generally associated with each individual passage 82, although not all passages 82 need include a louver 84. The louvers 84 can take on a variety of shapes and sizes and are usually all located on the same side of the baffle 80 (not all embodiments need include louvers 84 on the same side). The louvers 84 depicted in the illustrated embodiment are rectilinear and can have the same or roughly same shape and size as the passages 82.

The louvers 84 can extend from the baffle 80 any dimension and at any orientation sufficient to achieve a separation function but large enough to permit passage of compressed air without inordinate blockage and/or choking of the flow. In one form the louvers 84 extend from the passages 82 at about a 30 degree angle measured, but other angles are also contemplated, such as but not limited to 20, 40, 45, 50, and 60 degrees. The louvers 84 are located at the top of the passages 82, but other locations can also be used.

The louvers 84 can be rigidly attached to the baffle 80. In one form the louvers 84 are integral to the baffle 80. For example, in one form the louvers 84 can be formed via a stamping operation useful to form the passages 82 and bend the louvers 84 to an appropriate orientation. Such a stamping operation results in a locally yielded material between the main part of the louvers 84 and the baffle 80. Other techniques of formation are also contemplated.

As will be appreciated given the description and drawings herein, in one embodiment of the system 50 a mixed flow 58 of compressed gas and lubricant can be received in and delivered against one end of the tank 56. The flow progressed from the inlet 64 to the outlet 66 by first traversing through the baffles 80. The flow enters the passages 82 and traverses from an upstream side to a downstream side in which the flow encounters the louvers 84. Upon encountering the louvers 84 on the downstream side the flow is directed downward which interaction aids in further separation of compressed gas from the lubricant. The separation of the compressed gas and lubricant can be enabled by a change in direction and/or deceleration without any additional energy added to the system.

The baffle 80 can include a relief 86 formed in a bottom of the baffle 80 to assist in providing liquid levelling within the tank 56. In one form the relief is represented by a cutout edge of the baffle 80 such that the baffle 80 when installed will substantially contact the interior of the tank around a majority of its circumference with the exception of a small offset at the bottom of the baffle 80 between the relief 86 and the tank 56.

Although both baffles 80 are shown as identical, in some forms the baffles 80 can be different depending on the application. For example, one of the baffles 80 can include additional or differently formed passages 82 and/or louvers 84. The baffles 80 can sit vertical in the tank, but other angles are also contemplated. In those embodiments having two or more baffles 80, each of the separate baffles 80 can sit at the same, or at different angles.

Although the illustrated embodiment depicts two baffles 80, in some embodiments only a single baffle may be used, and can be located anywhere in the tank 56. For example, in one embodiment a single baffle 80 may be used and located closest to the inlet side of the tank 56, while in other embodiments a single baffle 80 may be used and located closer to the outlet of the tank 56. In still further forms any number of baffles 80 can be used.

The baffle 80 can be formed using a variety of approaches. In one form a material sheet stock can be provided from which can be cut the general outline of the baffle 80. The cutting action can use any variety of techniques such as laser cutting, die cutting, etc. The cut sheet stock can be processed further by a stamping action to form the passages 82 and louvers 84. The relief 86 can be formed from the original cutting action or the stamping procedure. Alternatively and/or additionally, the cutting and stamping action can be done in a single process step. Other processes are also contemplated. For example, the baffle 80 can be formed via additive manufacturing, casting, etc. The baffle 80 and/or tank 56 can be made from any variety of materials, including non-metallic materials. For example, the baffle 80 and/or tank 56 can be made from plastic, ceramic, etc. After formation the baffle 80 can be installed in the tank 56 using any variety of approaches such as mechanical (e.g. fasteners), metallurgical (e.g. welding), and chemical (e.g. bonding) to set forth just a few nonlimiting examples.

Figure 3A:
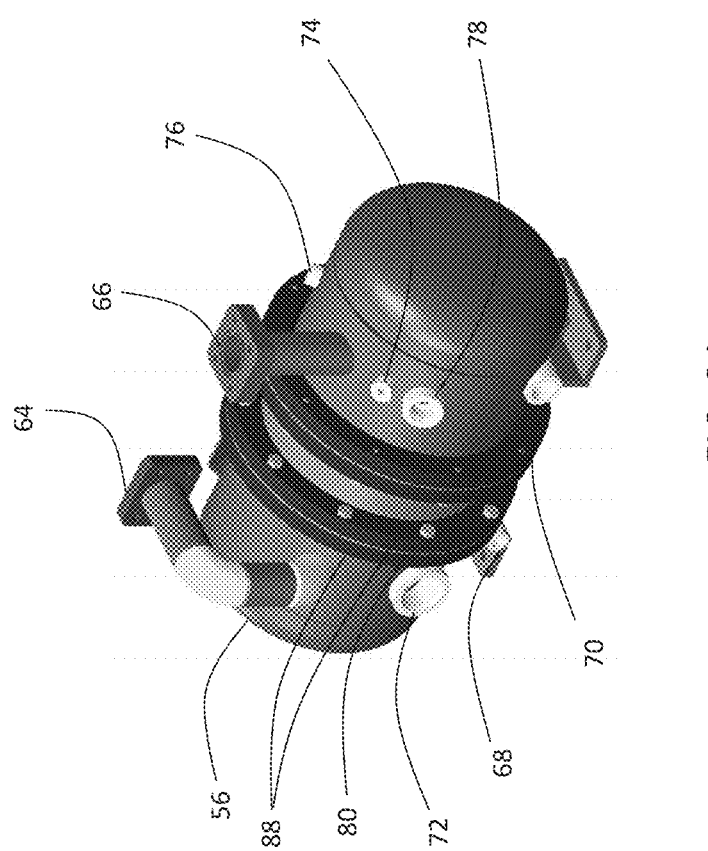
FIG. 3A depicts a view of another embodiment of a separator tank.
Figure 3B:
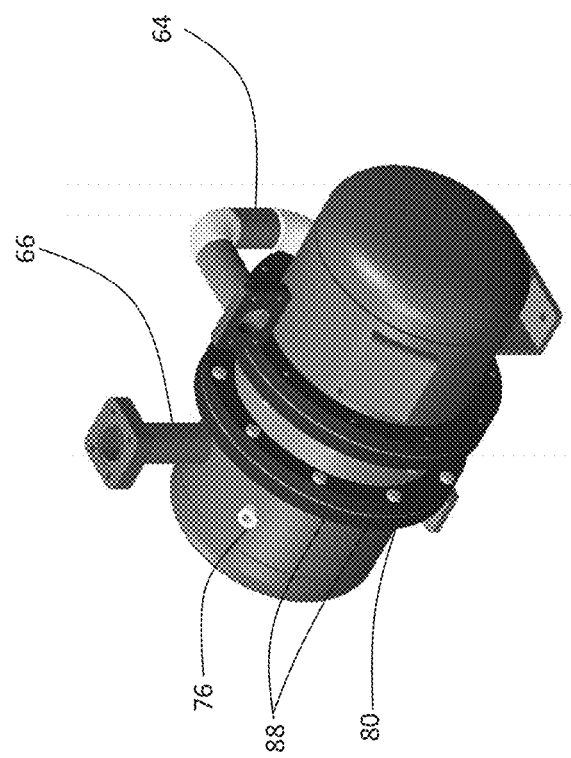
FIG. 3B depicts another view of the embodiment of the separator tank shown in FIG. 3A.

Turning now to FIGS. 3A-3B, one embodiment of the separator tank 56 includes a baffle 80 which is captured in place via flanges 88. The flanges 88 are depicted as bolted together in the illustrated embodiment, but can be fastened using other techniques as well. The embodiment depicted in FIGS. 3A-3B illustrate a separator tank 56 having two baffles 80 that are each captured in place via flanges 88, but other embodiments can include a mix of flange-capture and welded baffles 80. In still further embodiments, the separator tank may only include baffles 80 which are welded in place inside of the tank without use of any flanges. In still further forms the baffles 80 can be formed integral with the tank 56. For example, the baffles 80 and tank 56 can be formed through a casting process or through additive manufacturing, among any others that permit integral formation of the two. As above, one or more baffles 80 can be used in any given embodiment of the separator tank.

One aspect of the present application includes an apparatus comprising a compressor system separation tank having an inlet structured to receive a flow mixture of oil and compressed gas and an outlet to pass compressed gas, the separation tank including a baffle disposed located intermediate a first end and a second end of the separation tank, the baffle including a plurality of passages that permit a flow of compressed gas to pass from an upstream side of the baffle to a downstream side of the baffle, the baffle including a plurality of louvers that each extend from the plurality of passages in the baffle.

A feature of the present application includes wherein the plurality of louvers are oriented to point in a direction toward an end of the baffle.

Another feature of the present application includes wherein the plurality of louvers each span the width of its associated passage of the plurality of passages.

Still another feature of the present application includes wherein the plurality of louvers are each flat, and wherein the compressor system separation tank is a horizontal separation tank, wherein the baffle sits vertically within the separation tank, and wherein the louvers are on the downstream side of the baffle.

Yet another feature of the present application includes wherein the cross sectional area of the plurality of passages is less than the cross sectional area of the baffle material that surrounds the plurality of passages.

Still yet another feature of the present application includes wherein the plurality of louvers are pointed in the direction of flow such that an overhanging side of the louvers is on the downstream side of the baffle.

Yet still another feature of the present application further includes a second baffle, the second baffle including a plurality of openings and a plurality of louvers extending from the opening, and wherein the baffle and the second baffle each include a relief formed in an edge such that a passage is formed between an inside surface of the compressor system separation tank and the edge of the baffle.

Another aspect of the present application includes an apparatus comprising a compressor separation tank structured to remove lubricant from a flow of compressed gas, an inlet structured to receive a flow of the compressed gas and lubricant, an outlet structured to pass the compressed gas after removal of at least part of the lubricant that is received by the inlet, and a baffle disposed intermediate the inlet and the outlet, the baffle having a plurality of separate openings structured to communicate compressed gas from one side of the baffle to the other, each of the plurality of separate openings positioned adjacent a corresponding overhanging louver that extends away from the baffle.

A feature of the present application includes wherein the overhanging louver is positioned at the top of the each of the plurality of separate openings.

Another feature of the present application includes wherein the compressor separation tank is a horizontal separation tank in which the baffle is positioned upright on its end and fluid flows horizontally from one side of the baffle to the other side.

Still another feature of the present application includes wherein the baffle includes a relief formed in a bottom of the baffle such that an opening is provided to permit lubricant to flow freely from one side of the baffle to the other.

Yet another feature of the present application includes wherein the relief formed in the baffle is a flat bottom such that the passage is formed as a half-moon shape, the half-moon shape of the passage including a rounded bottom and a flat top.

Still yet another feature of the present application includes wherein the plurality of louvers are formed by stamping action such that a plurality of corners are formed between the baffle and the plurality of louvers wherein the corners are characterized by a locally yielded material, and wherein as a result of the stamping action each of the plurality of louvers are thus sized to fit within associated passages of the plurality of passages.

Yet still another feature of the present application further includes a second baffle positioned within the compressor separation tank.

Yet another aspect of the present application includes a method comprising providing a main cylindrical body of a horizontal separation tank structured to contain a pressurized flow of compressed gas and lubricant, inserting a baffle into the interior of the main cylindrical body of the horizontal separation tank, the baffle including a plurality of through openings structured to pass compressed gas, the plurality of through openings each including an associated louver that extends from the baffle, and fixing the baffle into place within the interior of the main cylindrical body.

A feature of the present application includes wherein the fixing includes welding the baffle in place within the main cylindrical body of the horizontal separation tank.

Another feature of the present application includes wherein the inserting includes forming a passage space between the bottom of the main cylindrical body and a relief formed at the bottom of the baffle.

Yet another feature of the present application further includes fastening end caps to the open ends of the main cylindrical body of the horizontal separation tank.

Still another feature of the present application further includes forming the baffle by cutting a piece of material sheet stock.

Yet still another feature of the present application includes wherein the cutting includes at least one of die cutting and laser cutting.

Still yet another feature of the present application includes wherein the forming further includes stamping the piece of material sheet stock.

In yet another aspect the present application provides a method comprising providing a main body of a horizontal separation tank structured to contain a pressurized flow of compressed gas and lubricant, inserting a baffle into the interior of the main body of the horizontal separation tank, the baffle including a plurality of through openings structured to pass compressed gas, the plurality of through openings each including an associated louver that extends from the baffle, and fixing the baffle into place within the interior of the main body.

One feature of the present application includes wherein the fixing includes welding the baffle in place within the main body of the horizontal separation tank.

Another feature of the present application includes wherein the inserting includes forming a passage space between the bottom of the main body and a relief formed at the bottom of the baffle.

Yet another feature of the present application further includes fastening end caps to the open ends of the main body of the horizontal separation tank.

Still another feature of the present application further includes forming the baffle by cutting a piece of material sheet stock.

Still yet another feature of the present application includes wherein the cutting includes at least one of die cutting and laser cutting.

Yet still another feature of the present application includes wherein the forming further includes stamping the piece of material sheet stock.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a compressor separation tank structured to remove lubricant from a flow of compressed gas;
   an inlet structured to receive a flow of the compressed gas and lubricant;
   an outlet structured to pass the compressed gas after removal of at least part of the lubricant that is received by the inlet; and
   a baffle disposed intermediate the inlet and the outlet, the baffle having a plurality of separate openings structured to communicate compressed gas from one side of the baffle to the other, each of the plurality of separate openings positioned adjacent a corresponding overhanging louver that extends away from the baffle, wherein each of the overhanding louvers are located on the same side of the baffle, and wherein each of the overhanding louvers extend from the baffle in a direction toward a side of the baffle;
   wherein the baffle includes a relief formed in a bottom of the baffle such that an opening is provided to permit lubricant to flow freely from one side of the baffle to the other;
   wherein the relief formed in the baffle is a flat bottom such that the passage is formed as a half-moon shape, the half-moon shape of the passage including a rounded bottom and a flat top.

2. The apparatus of claim 1, wherein the overhanging louver is positioned at the top of the each of the plurality of separate openings.

3. The apparatus of claim 2, wherein the compressor separation tank is a horizontal separation tank in which the baffle is positioned upright on its end and fluid flows horizontally from one side of the baffle to the other side.

4. The apparatus of claim 1, wherein the plurality of louvers are formed by stamping action such that a plurality of corners are formed between the baffle and the plurality of louvers wherein the corners are characterized by a locally yielded material, and wherein as a result of the stamping action each of the plurality of louvers are thus sized to fit within associated passages of the plurality of passages.

5. The apparatus of claim 4, which further includes a second baffle positioned within the compressor separation tank.

6. The apparatus of claim 1, wherein each of the overhanging louvers associated with the plurality of separate openings is connected to a top portion of each of the separate openings such that the overhanging louvers point away from the top portion and in the downward direction.

* * * * *